United States Patent [19]

Saitou et al.

[11] 4,320,879
[45] Mar. 23, 1982

[54] TAPE CASSETTE DRIVE ASSEMBLY

[75] Inventors: Sinichi Saitou; Toshikazu Kato; Seizo Watanabe, all of Hachioji; Toyoo Nishiyama, Musashimurayama; Misao Shimoda, Hamura; Tutomu Shibata, Hachioji; Kenji Kimura, Tachikawa; Ken Satoh, Akikawa, all of Japan

[73] Assignee: Olympus Optical Co., Ltd., Tokyo, Japan

[21] Appl. No.: 136,449

[22] Filed: Apr. 2, 1980

[51] Int. Cl.³ .......................... G03B 1/04; G11B 15/32
[52] U.S. Cl. ................................................... 242/189
[58] Field of Search ................ 242/189, 190, 200–204; 360/71, 72, 96, 132; 226/195

[56] References Cited

U.S. PATENT DOCUMENTS

| 3,790,055 | 2/1974 | Sims, Jr. | 226/195 X |
| 3,800,322 | 3/1974 | Schoettle et al. | 360/96 |
| 4,214,283 | 7/1980 | Fushimi et al. | 360/71 |
| 4,228,972 | 10/1980 | Koppensteiner | 242/201 |

*Primary Examiner*—Leonard D. Christian

*Attorney, Agent, or Firm*—Frishauf, Holtz, Goodman and Woodward

[57] ABSTRACT

A device for stably running a magnetic recording tape of a tape cassette comprises a reel shaft and a motor connected to the reel shaft. The reel shaft and the motor make a running of the magnetic recording tape providing back tension exerted on the magnetic recording tape. Within the housing of the tape cassette, a first lever having one end rotatably fixed to the housing is mounted. A guide roller for guiding the running direction of the tape is rotatably fixed to another end of the first lever. Therefore, the first lever may swing in response to a back tension exerted on the tape. An amount of the swing of the first lever is detected by a second lever which is rotably located out of the housing and selectably engaged with the first lever. The second lever is connected to the detection means which generates an electric signal in accordance with the amount of rotation of the second lever. The electric signal is sent to the electric controlling circuit means electrically connected to the motor. The electric controlling circuit means controls a value of the voltage supplied to the motor in accordance with the electric signal, and stabilize the value of the back tension exerted to the tape via the motor and the reel shaft.

8 Claims, 5 Drawing Figures

TAPE CASSETTE DRIVE ASSEMBLY

BACKGROUND OF THE INVENTION

This invention relates to a tape cassette drive assembly having a stabilizing device for enabling a magnetic recording tape of a tape cassette to run at a constant speed.

In a conventional tape cassette, back tension alone is utilized for allowing a magnetic recording tape to slidably contact a magnetic head. Changes in the running speed of the magnetic recording tape are brought about if the back tension has been varied by, for example, eccentricity of the reel shaft, friction between the magnetic recording tape and the housing of the tape cassette, and uneven winding of the magnetic recording tape. This gives rise to drawbacks such as occurrence of wow and flutter as well as level fluctuation in reproducing the information recorded in advance in the magnetic recording tape.

SUMMARY OF THE INVENTION

An object of this invention is to provide a tape cassette drive assembly having a stabilizing device for enabling a magnetic recording tape of a tape cassette to run at a constant speed by maintaining constant the back tension exerted on the magnetic recording tape.

DETAILED DESCRIPTION OF THE PREFERRED EMBODIMENTS

Figure 1:
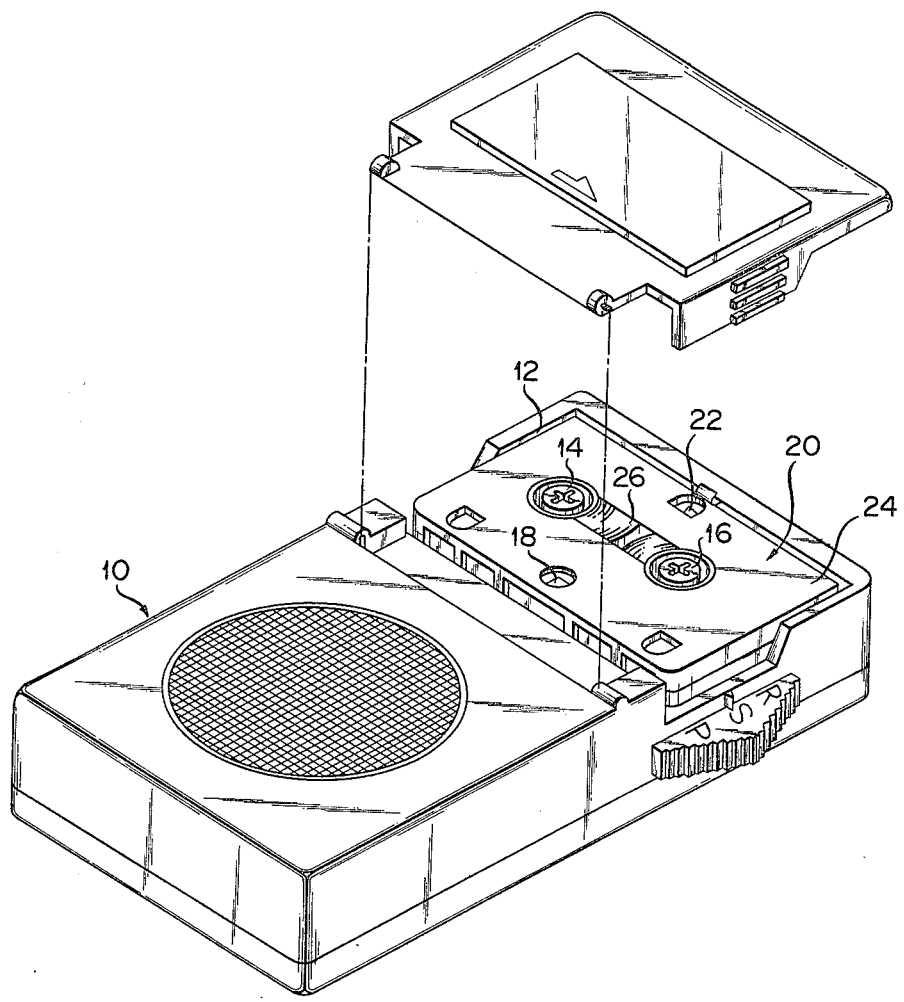
FIG. 1 is a perspective view showing an assembly of a tape cassette and a tape recorder, said assembly utilizing a stabilizing device according to one embodiment of this invention.
Figure 2:
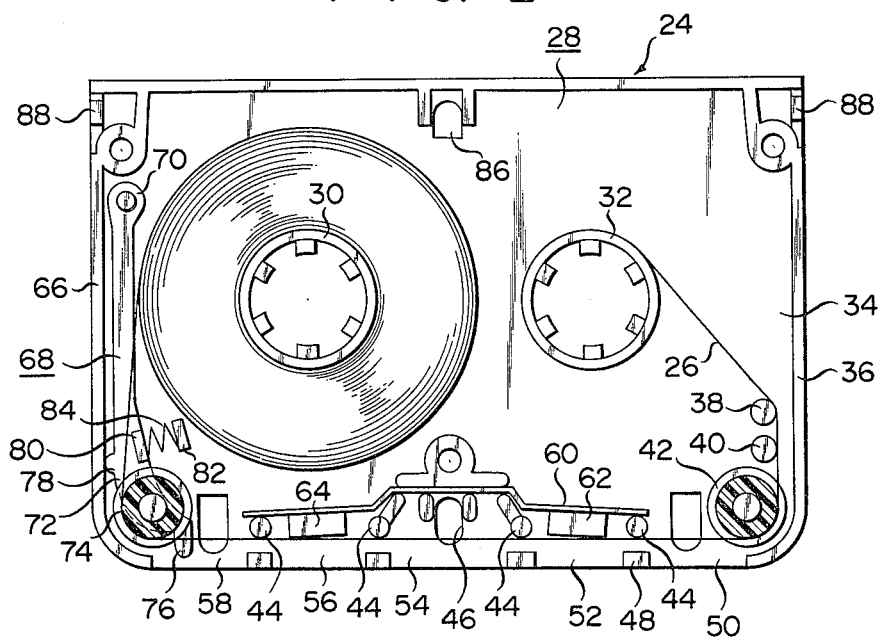
FIG. 2 is a plan view showing the main portion of the tape cassette shown in FIG. 1.

FIG. 1 shows that a tape cassette 20 is mounted to a recess 12 of a tape recorder 10. A pair of reel shafts 14, 16 and a capstan 18 are projected within the recess 12. Further, a plurality of pins 22 serving to regulate the location of the tape cassette 20 housed in the recess 12 are provided within the recess 12 as clearly shown in, particularly, FIG. 3. The tape cassette 20 comprises a housing 24 and a magnetic recording tape 26 disposed within the housing 24 as shown in FIG. 1. FIG. 2 shows that the housing 24 consists of a lower half 28 and an upper half, not shown. It is seen that a pair of reel hubs 30, 32 are rotatably mounted within the housing 24. Two guide pins 38, 40 are mounted to an inner surface of a bottom wall 34 of the lower half 28 near a right wall 36 of the lower half 28. Further, a first guide roller 42 is rotatably mounted to the inner surface of the bottom wall 34 at the front-right corner. Also, four guide pins 44 are mounted to the inner surface of the bottom wall 34 along, but apart from, a front wall 48 of the lower half 28. It is seen that a hole 46 for receiving the capstan 18 is formed in the bottom wall 34. The hole 46 is located near the front wall 48 and at a center between the right wall 36 and a left wall explained later. The front wall 48 of the lower half 28 is provided with first to fifth openings 50, 52, 54, 56 and 58. The third opening 54 located in the center is for receiving a pinch roller described later. The second and fourth openings 52 and 56 located at a left and a right sides of the third opening 54 respectively are for receiving a magnetic head described later. As shown in the drawing, head pads 62, 64 supported by an elastic member 60 are provided in the inner surface and near the front wall 48. Those two head pads 62, 64 face the second and fourth openings 52, 56, respectively.

FIG. 2 shows that a lever 68 is provided within the lower half 28 in a manner to extend along the left wall 66 of the lower half 28. The lever 68 is swingably pivoted to the bottom wall 34 at a rear end 70 such that the lever 68 is swingable in parallel with the bottom wall 34. Further, a second guide roller 74 is rotatably mounted to an upper surface of a front end 72 of the lever 68, said front end 72 being located in the front-left corner of the bottom wall 34. The front end 72 of the lever 68 is provided with a first projection 76 extending toward the fifth opening 58 located at a left side of the fourth opening 56. The lever 68 is also provided with a second projection 78 extending toward the left wall 66 of the housing 24. By contacting with the inner surface of the left wall 66, the second projection 78 serves to prevent the second guide roller 74 from contacting with the left wall 66 and, thus, from being rendered incapable of rotation when the lever 68 is swung toward the left wall 66. The upper surface of the lever 68 is also provided with a first upward projection 80. On the other hand, a second upward projection 82 is formed on the inner surface of the bottom wall 34. An urging means, a compression coil spring 84 in this embodiment, is laid between the first and second upward projections 80 and 82. The compression coil spring 84 serves to urge the lever 68 toward the left wall 66.

FIG. 2 shows that a hole 86 is formed in the bottom wall 34 near a rear wall of the lower half 28. The hole 86 is located at a center between the right wall 36 and the left wall 66. The hole 86 serves to receive one of the pins 22 for regulating the location of the tape cassette 20 housed in the recess 12 of the tape recorder 10. Further, removable lugs 88 for preventing accidental erasing of the information already recorded in the magnetic tape are formed at the rear ends of the left and right walls 66 and 36.

One end of a magnetic recording tape 26 is fixed to the reel hub 30, with the other end of the tape 26 fixed to the reel hub 32. As shown in the drawing, the magnetic recording tape 26 is stretched between the reel hubs 30 and 32 by the second and first guide rollers 74 and 42 serving to guide the tape 26 along the front wall 48 of the housing 24.

In the conventional tape cassette, the second guide roller 74 is rotatably mounted to the upper surface of the bottom wall 34 in the same way as the first guide roller 42. Further, the lever 68 and the compression coil spring 84 are not included in the conventional tape cassette. In the embodiment of this invention described above, the lever 68, compression coil spring 84 and second guide roller 74 in contact with the magnetic recording tape 26 constitute a moving mechanism. The lever 68 having the second guide roller 74 rotatably mounted thereto is swung in the clockwise or counterclockwise direction in accordance with the magnitude of the back tension exerted to the magnetic recording tape 26.

Figure 3:
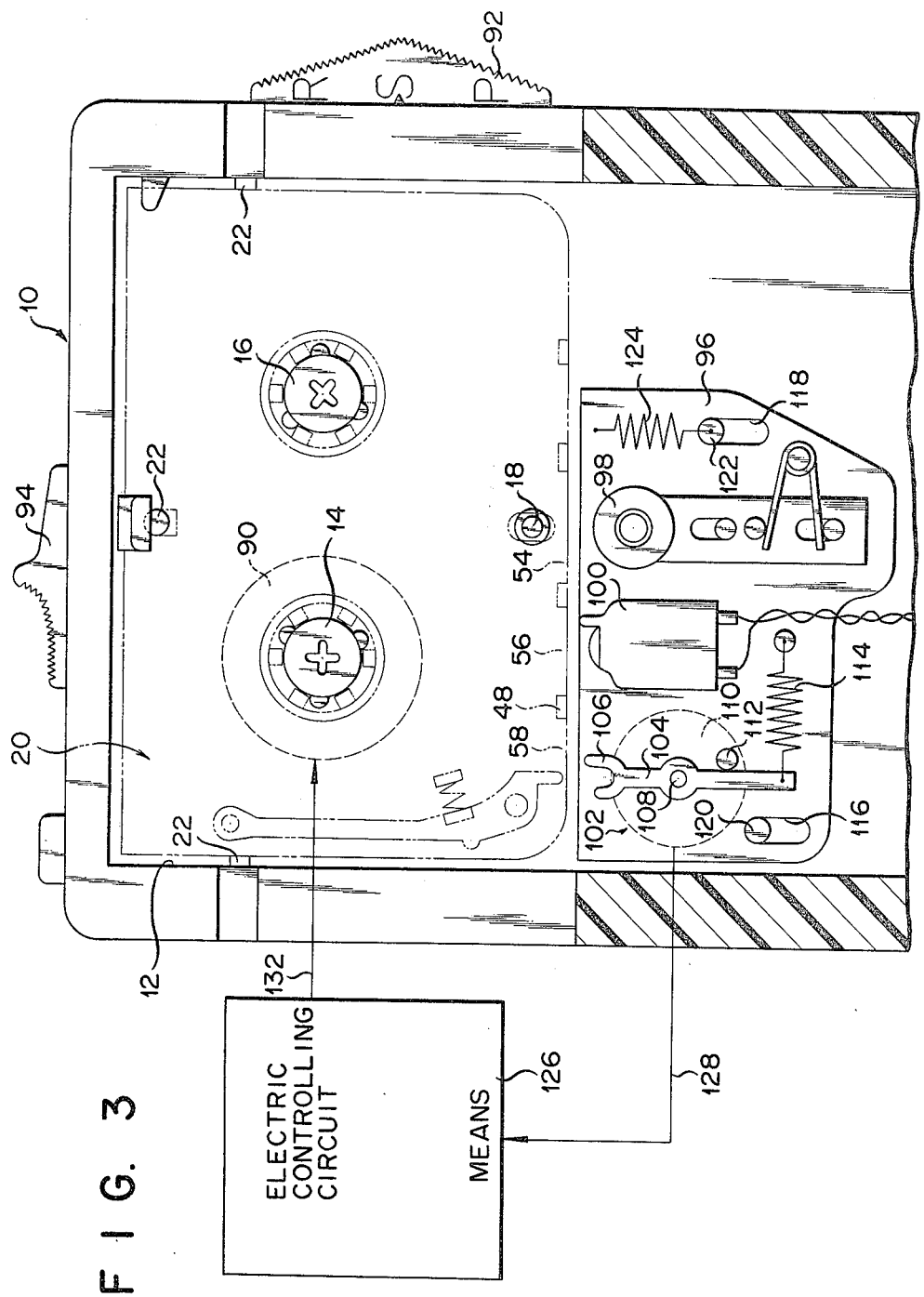
FIG. 3 is a plan view schematically showing the main portion of the tape recorder shown in FIG. 1.

As clearly seen from FIG. 3, the reel shaft 14 is connected to a D.C. motor 90. The reel shaft 14 and the D.C. motor 90 constitute a means for running the magnetic recording tape 26 with back tension exerted thereto. Incidentally, each of the reel shaft 16 and the capstan 18 is also connected to a D.C. motor (not shown) independently. Further, the reel shafts 14, 16 and the capstan 18 are rotated independently. If a first switch 92 of the tape recorder 10 is set at a Play mode, the capstan 18 is rotated by the D.C. motor (not shown) connected thereto at a constant speed in the counterclockwise direction. At the same time, the reel shaft 14 is rotated by the D.C. motor 90 in the clockwise direction. Also, the reel shaft 16 is rotated by the D.C. motor (not shown) connected thereto in the counterclockwise direction with a torque greater than that of the reel shaft 14.

If the first switch 92 is set at a Rewind mode the reel shaft 14 is rotated by the D.C. motor 90 in the clockwise direction with a torque greater than that in the Play mode. In this step, a current is not supplied to the D.C. motor connected to the reel shaft 16. Thus, the reel shaft 16 is not rotated by the D.C. motor connected thereto but can rotate freely in the clockwise or in the counterclockwise direction. But, the capstan 18 is rotated by the D.C. motor connected thereto at the same constant speed and in the same direction as in the Play mode.

If a second switch 94 of the tape recorder 10 is set at a Fast Forward mode, the reel shaft 16 is rotated by the D.C. motor connected thereto in the counterclockwise direction with a torque equal to that in the Play mode. Also, the capstan 18 is rotated by the D.C. motor connected thereto at the same constant speed and in the same direction as in the Play mode. But, the current is not supplied to the D.C. motor 90 serving to rotate the reel shaft 14. Thus, the reel shaft 14 is not rotated by the D.C. motor connected thereto but can rotate freely in the counterclockwise or in the clockwise direction.

The tape recorder 10 comprises a chassis (not shown) provided with a movable plate 96 arranged in parallel with a bottom surface of the recess 12. As clearly shown in FIG. 3, a pinch roller 98, a magnetic head 100 and a lever 104 are mounted to the upper surface of the movable plate 96. The lever 104 is a constituent of a detection mechanism 102. The pinch roller 98 is located to face the third opening 54 formed in the front wall 48 of the lower half 28. The magnetic head 100 is located to face the fourth opening 56 formed in the front wall 48. Further, the lever 104 is located to face the fifth opening 58 and to be parallel with the upper surface of the movable plate 96. It is seen that the lever 104 extends toward the front wall 48 of the lower half 28 in a direction perpendicular to the front wall 48. The lever 104 is branched into two projections at one end 106 adjacent to the front wall 48 and is fixed in the central portion to the upper end of a shaft 108 vertically disposed to the movable plate 96 and rotatably mounted to the movable plate 96. It follows that the lever 104 is rotatable on the shaft 108 within a plane parallel with the upper surface of the movable plate 96. In this embodiment, the lever 104 and the shaft 108 constitute a rotatable member. The lower end of the shaft 108 is positioned below the movable plate 96 and joined to a means 110 for detecting the amount of the rotation of the lever 104. The detection means 110 is of a known structure and generates electric signals corresponding to the rotation amount of the lever 104, namely, to the rotation angle of the shaft 108. In this case, said electric signal indicates an amount of a change of a voltage corresponding to the rotation angle.

A pin 112 is fixed on the upper surface of the movable plate 96. The upper end of the pin 112 is located in a locus of the rotation of the other end of the lever 104. When the lever 104 is positioned to extend in a direction perpendicular to the front wall 48, the right edge of the lever 104 abuts against the pin 112 as shown in FIG. 3. An urging means, a tension coil spring 114 in this embodiment, is stretched between the other end of the lever 104 and a pin fixed on the upper surface of the movable plate 96. As is apparent from FIG. 3, the coil spring 114 urges the lever 104 to rotate in the counterclockwise direction, with the result that the right edge of the lever 104 is normally allowed to abut against the pin 112.

The movable plate 96 is provided with a pair of slots 116 and 118 apart from each other and extending in a direction perpendicular to the front wall 48. A pair of guide pins 120 and 122 fixed to the chassis (not shown) of the tape recorder 10 extend through the slots 116 and 118, respectively. It follows that the movable plate 96 is movable in only the direction perpendicular to the front wall 48. FIG. 3 shows that an urging means, a tension coil spring 124 in this embodiment, is stretched between the guide pin 122 and a pin fixed on the upper surface of the movable plate 96. The coil spring 124 serves to urge the movable plate 96 in a manner to pull the movable plate 96 away from the tape cassette 20 housed in the recess 12 of the tape recorder 10.

Figure 4:
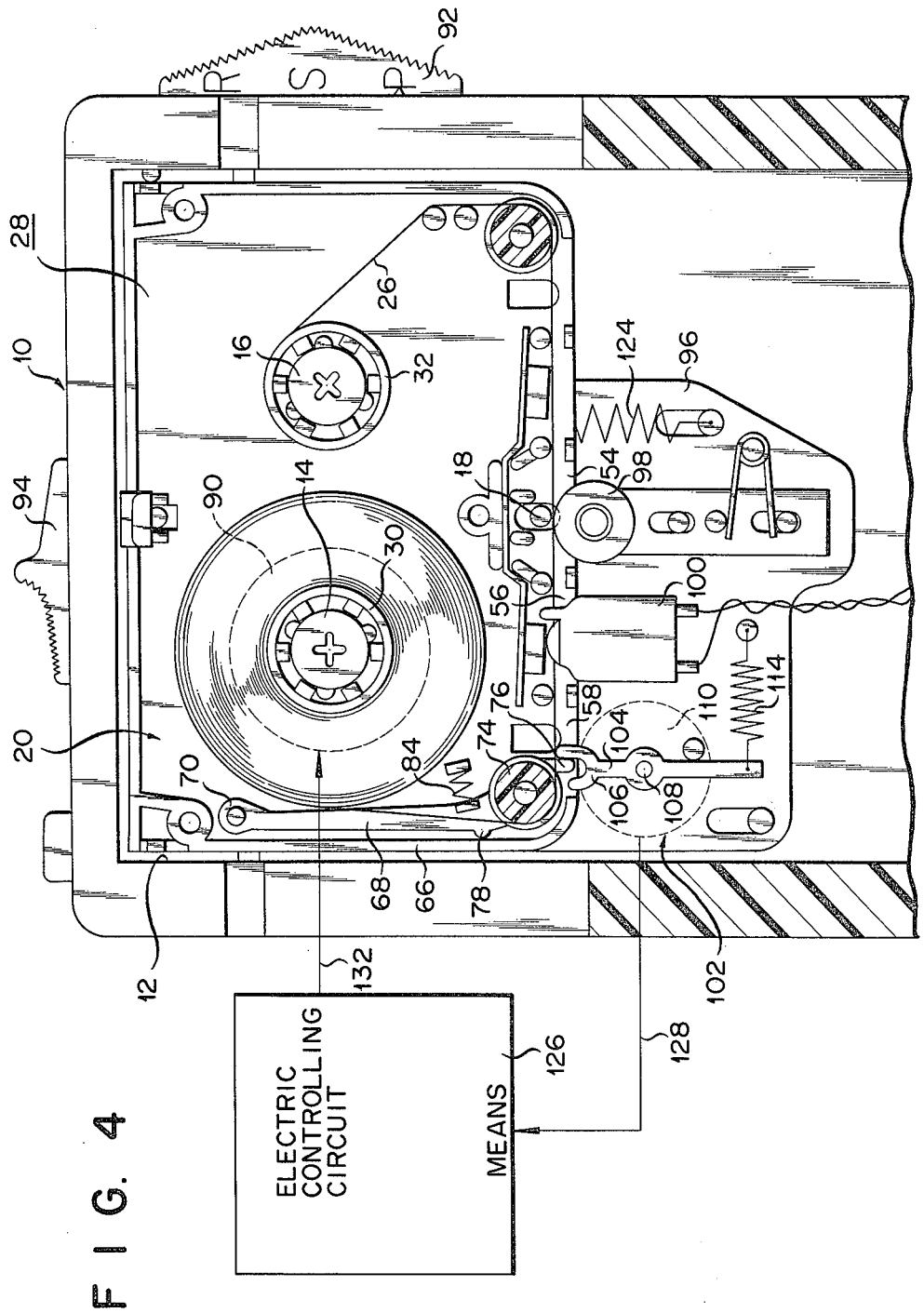
FIG. 4 is a plan view schematically showing how the tape cassette shown in FIG. 2 is mounted to the tape recorder shown in FIG. 3 in preparation for operation of said tape recorder.

The movable plate 96, which is joined to the first switch 92 via a joining mechanism (not shown), is moved by the operation of the first switch 92. Specifically, when the first switch 92 has been set at the Play mode, the movable plate 96 is moved against the urging force of the coil spring 124 toward the tape cassette 20 housed in the recess 12 of the tape recorder 10, as shown in FIG. 4. In this step, the pinch roller 98 is inserted into the third opening 54 so as to have the magnetic recording tape 26 held between the pinch roller 98 and the capstan 18. Further, the magnetic head 100 is brought into contact with the magnetic recording tape 26. Still further, the branched end 106 of the lever 104 is engaged with the first projection 76 of the lever 68 mounted within the housing 24 of the tape cassette 20. As described previously, the lever 68 is swingable about the rear end 70 in the clockwise or counterclockwise direction. Naturally, the lever 104 and the shaft 108 are caused to rotate by the swinging motion of the lever 68 in the direction opposite to the swinging direction of the lever 68. It follows that the rotation amount detection means 110 is enabled to generate electric signals corresponding to the amount of movement of the lever 68. As is apparent from the above description, the rotatable member including the lever 104 and the shaft 108, and the detection means 110 constitute a mechanism for detecting the amount of movement of the lever 68.

FIG. 4 shows that the detection means 110 is electrically connected to an electric controlling circuit means 126 having a well known structure via a conductive wire 128. Likewise, the electric controlling circuit means 126 is electrically connected via a conductive wire 132 to the D.C. motor 90 connected to the reel shaft 14. Upon receipt of the electric signal generated by the detection means 110, the electric controlling circuit means 126 controls the voltage of the current supplied to the D.C. motor 90 so as to control the torque of the reel shaft 14 rotated by the D.C. motor 90. To be more specific, the lever 68 is swung in the counterclockwise direction if a change has been brought about by some cause in the back tension exerted on the magnetic recording tape 26 running at a constant speed during the Play mode. The swinging motion of the lever 68 mentioned above causes the lever 104 and the shaft 108 to rotate in the clockwise direction, with the result that the detection means 110 generates an electric signal corresponding to the rotation angle of the shaft 108. Upon receipt of the electric signal, the electric controlling circuit means 126 serves to lower the voltage supplied to the D.C. motor 90 in accordance with the electric signal so as to decrease the torque of the reel shaft 14. It follows that the back tension exerted on the magnetic recording tape 26 is decreased so as to cause the lever 68 to be swung in the clockwise direction. The swinging motion of the lever 68 is stopped when the second projection 78 of the lever 68 has abutted against the inner surface of the left wall 66 of the lower half 28.

The apparatus of the construction described above is operated as described in the following. In the first step, the tape cassette 20 is loaded in the recess 12 of the tape recorder 10 as denoted by an imaginary line in FIG. 3 by engaging the reel hubs 30, 32 of the tape cassette with the reel shafts 14, 16. Then, the first switch 92 is set at the Play mode so as to move the movable plate 96 toward the tape cassette 20 against the urging force of the coil spring 124 as shown in FIG. 4. In accordance with movement of the movable plate 96, the pinch roller 98 is inserted into the third opening 54 so as to allow the magnetic recording tape 26 to be held between the pinch roller 98 and the capstan 18. Further, the magnetic head 100 is inserted into the fourth opening 56 so as to contact the magnetic recording tape 26. Still further, the branched end 106 of the lever 104 is inserted into the fifth opening 58 so as to be engaged with the first projection 76 of the lever 68 with the branched two projections. It should be noted that electric current is supplied to the D.C. motor 90 connected to the reel shaft 14 as well as to the D.C. motors connected to the reel shaft 16 and the capstan 18 as soon as the movable plate 96 has been moved to the position mentioned above.

The capstan 18 is rotated in the counterclockwise direction at a constant peripheral velocity. Since the magnetic recording tape 26 has to be held between the capstan 18 and the pinch roller 98, the tape 26 is run to the right, i.e., from the capstan 18 toward the first guide roller 42, at a constant speed and wound around the reel hub 32 rotating in the counterclockwise direction. It should be noted that the reel shaft 14 is rotated in the clockwise direction with a torque smaller than that of the reel shaft 16 as described previously. Thus, back tension is exerted on the magnetic recording tape 26, resulting in that the second guide roller 74 rotatably mounted to the lever 68 is urged to the right, and the second projection 78 is left from the inner surface of the left wall 66. Naturally, the lever 68 is swung in the counterclockwise direction to reach a point at which the magnitude of the back tension is balanced with the sum of the urging forces of the compression coil spring 84 and coil spring 114 and the frictional resistances of the lever 68 and detection mechanism 102. The lever 68 is held stationary in the balancing point as far as magnitude of the back tension remains constant.

The detection means 110 is designed to perform its function on the basis of the rotation angle of the lever 104, or the shaft 108, at the time when the lever 68 is held in the balancing point. In other words, the rotation angle of the lever 104 mentioned above provides the standard angle with respect to the function of the detection means 110. Specifically, when the lever 104 has been rotated to deviate from the standard angle in the clockwise or counterclockwise direction, the detection means 110 generates an electric signal based on the change of the voltage corresponding to the difference between the standard angle and the actual rotation angle of the lever 104. Suppose a big change has occurred suddenly in the diameter of the magnetic recording tape 26 wound around the reel hub 30 that is the change of the diameter out of the constant changing rate of the diameter has happened. In this case, the back tension exerted on the tape 26 rapidly increases, resulting in that the lever 68 is further swung in the counterclockwise direction from the balancing point. The swinging motion of the lever 68 causes the lever 104 to rotate in the clockwise direction, with the result that the detection means 110 is allowed to generate an electric signal corresponding to the difference between the standard angle and the actual rotation angle of the lever 104. The electric signal thus generated is supplied to the electric controlling circuit means 126 through the conductive wire 128. Upon receipt of the electric signal, the electric controlling circuit means 126 serves to lower the voltage applied to the D.C. motor 90 in accordance with the electric signal. It follows that the torque of the D.C. motor 90 is decreased, leading to reduction in the back tension exerted on the magnetic recording tape 26. As a result, the lever 68 is swung in the clockwise direction by the urging force of the compression coil spring 84 so as to bring the lever 68 back to the balancing point.

It may be possible that the lever 68 is swung in the clockwise direction to pass through the balancing point. Also, the lever 68 held in the balancing point is swung in the clockwise direction when the back tension exerted to the tape 26 has been rapidly decreased by some cause. In such a case, the detection means 110 also generates an electric signal in accordance with the difference between the standard angle and the actual rotation angle of the lever 104. Upon receipt of the electric signal, the electric controlling circuit means 126 serves to increase the voltage supplied to the D.C. motor 90 in accordance with the electric signal. Thus, the torque of the D.C. motor 90 is increased so as to increase the back tension exerted on the magnetic recording tape 26. It follows that the lever 68 is swung in the counterclockwise direction against the urging force of the compression coil spring 84 so as to bring the lever 68 back to the balancing point.

This invention is not restricted to the embodiment described above. Of course, it is possible to provide various modifications within the technical scope of this invention.

Figure 5:
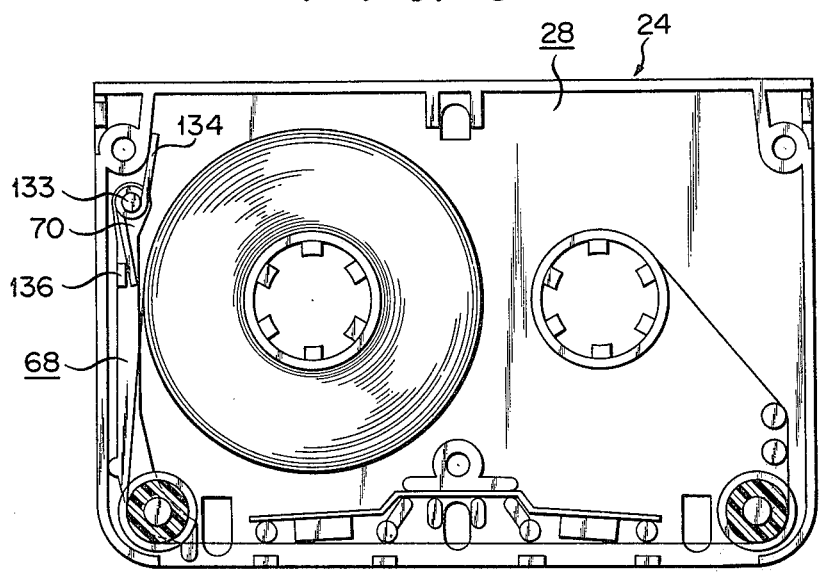
FIG. 5 is a plan view showing a modification of the moving mechanism included in the tape cassette shown in FIG. 2.

For example, it is possible to substitute a torsion coil spring 134 shown in FIG. 5 for the compression coil spring 84. As seen from FIG. 5, the torsion coil spring 134 is wound about a pin 132 rotatably pivoting the lever 68 at the rear end 70. One end portion of the torsion coil spring 134 extends along the inner surface of the bottom wall 34 of the lower half 28 and abuts the inner surface of the housing 24, with the other end portion abutting against an upward projection 136 formed on the lever 68. As is apparent from the drawing, the torsion coil spring 134 serves to urge the lever 68 toward the inner surface of the left wall 66 of the lower half 28.

Further, the guide pins 38, 40 and the first guide roller 42 can be replaced by a moving mechanism equal to that consisting of the lever 68, urging means 84 and second guide roller 74. This modification is advantageous in that the stabilizing device of this invention can be utilized even when the tape cassette 24, which has been turned upside down, is loaded in the recess 12 of the tape recorder 10.

What we claim is:

1. A device for stably running a magnetic recording tape of a tape cassette which comprises a housing and a magnetic recording tape housed within the housing, the device comprising:
   means for running the magnetic recording tape while providing back tension exerted on the magnetic recording tape;
   a moving mechanism provided within the housing of the tape cassette with the magnetic recording tape, said moving mechanism being moved in accordance with a magnitude of the back tension exerted on the magnetic recording tape;
   a detection mechanism for detecting an amount of movement of the moving mechanism; and
   an adjusting means connected to the detection mechanism and to the magnetic recording tape running means, said adjusting means including means for adjusting the magnitude of the back tension exerted on the magnetic recording tape in accordance with the amount of movement of the moving means detected by the detection mechanism so as to maintain constant the magnitude of the back tension.

2. The device according to claim 1, wherein the moving mechanism comprises a lever swingably pivoted at one end to the housing of the tape cassette and having a guide member for changing a running direction of the magnetic recording tape mounted to the other end, said lever being swung by the back tension exerted on the magnetic recording tape, and urging means provided between the lever and the housing of the tape cassette for urging the lever in the direction opposite to the direction in which the lever is swung by the back tension exerted on the magnetic recording tape.

3. The device according to claim 2, wherein the detection mechanism comprises a rotary member, which is coupled with the lever of the moving mechanism while the magnetic recording tape is being run so as to be rotated in accordance with the swinging motion of the lever, and a detection means joined to the rotary member, said detection means generating electric signals in accordance with the amount of rotation of the rotary member.

4. The device according to claim 2, wherein the detection mechanism comprises a moving member, which is coupled with the lever of the moving mechanism while the magnetic recording tape is being run so as to be moved in accordance with the swinging motion of the lever, and a detecting means joined to the moving member, said detecting means generating electric signals in accordance with the amount of movement of the moving member.

5. The device according to any one of claims 1 to 3, wherein the magnetic recording tape running means comprises a reel shaft and a motor connected to the reel shaft.

6. The device according to claim 5, wherein the adjusting means is an electrical controlling circuit means serving to change the magnitude of the torque of the motor included in the tape running means in response to the electrical signal generated from the rotation amount detection means so as to control the back tension exerted on the magnetic recording tape.

7. The device according to any one of claims 1, 2 and 4, wherein the magnetic recording tape running means comprises a reel shaft and a motor connected to the reel shaft.

8. The device according to claim 7, wherein the adjusting means is an electrical controlling circuit means serving to change the magnitude of the torque of the motor included in the tape running means in response to the electrical signal generated from the movement amount detection means so as to control the back tension exerted on the magnetic recording tape.

* * * * *

UNITED STATES PATENT AND TRADEMARK OFFICE
CERTIFICATE OF CORRECTION

PATENT NO. : 4,320,879
DATED : March 28, 1982
INVENTOR(S) : Sinichi SAITOU, et al It is certified that error appears in the above—identified patent and that said Letters Patent is hereby corrected as shown below:

In the heading of the patent, insert the following data:

--Foreign Application Priority Data
April 10, 1979 [JP]   Japan.............54-43287--;

In the Abstract:
next to last line, change "exerted to" to --exerted on--.

Signed and Sealed this

Seventeenth Day of August 1982

[SEAL]

Attest:

GERALD J. MOSSINGHOFF

Attesting Officer    Commissioner of Patents and Trademarks